April 3, 1928.  H. BRODIE  1,664,732
BRAKE OPERATING MECHANISM
Filed Oct. 23, 1926
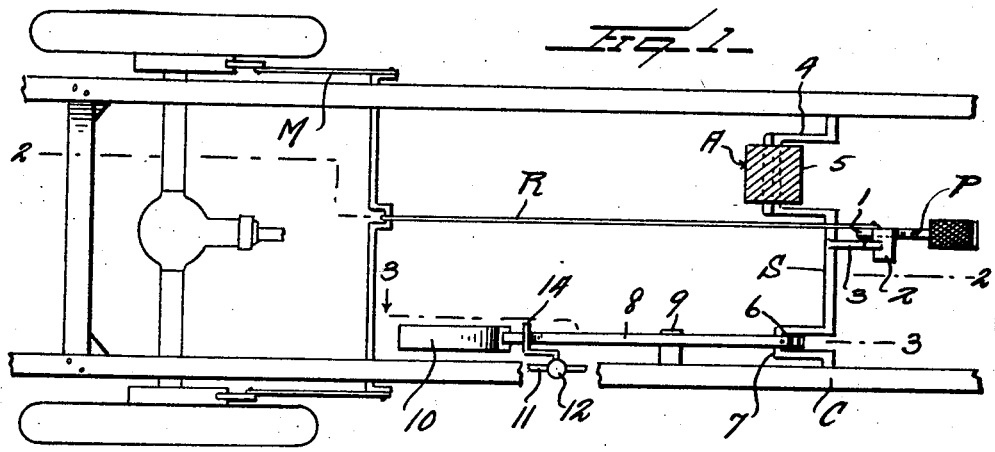
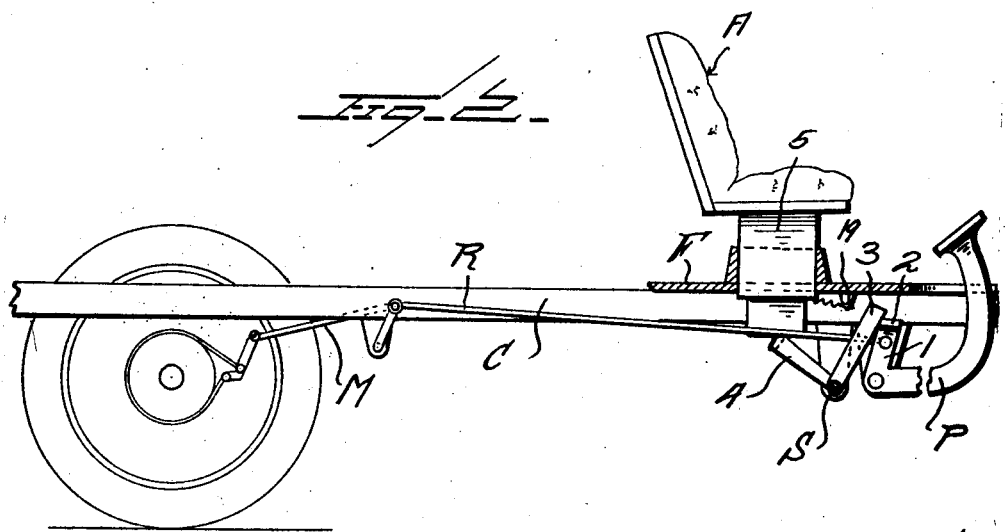
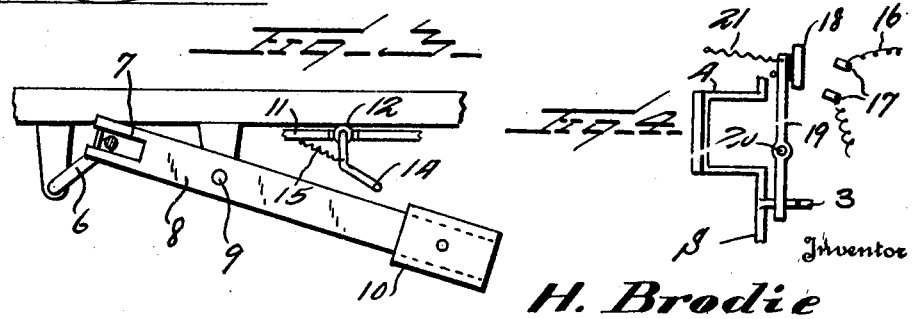
Inventor
H. Brodie
By Watson E. Coleman
Attorney Patented Apr. 3, 1928.

1,664,732

UNITED STATES PATENT OFFICE.

HERBERT BRODIE, OF DETROIT, MICHIGAN, ASSIGNOR OF ONE-HALF TO ALBERT R. SAUNDERS, OF DETROIT, MICHIGAN.

BRAKE-OPERATING MECHANISM.

Application filed October 23, 1926. Serial No. 143,672.

This invention relates to brake operating mechanisms and it is an object of the invention to provide a mechanism of this kind whereby such mechanism is automatically set when the driver's seat is freed of the weight of the operator.

It is also an object of the invention to provide a mechanism of this kind especially designed for use in connection with a motor driven vehicle and wherein means are also provided to operate automatically with the setting of the brake mechanism to shut off either the ignition circuit for the motor or the fuel supply or both.

The invention consists in the details of construction and in the combination and arrangement of the several parts of my improved brake operating mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in top plan and of a diagrammatic character illustrating a brake operating mechanism constructed in accordance with an embodiment of my invention;

Figure 2 is a sectional view taken substantially on the line 2—2 of Figure 1;

Figure 3 is a sectional view taken substantially on the line 3—3 of Figure 1;

Figure 4 is a detailed fragmentary view of a portion of the means for controlling the ignition circuit.

As disclosed in the accompanying drawing, P denotes a pedal for operating the brake mechanism M in a well known manner through the instrumentality of the rod R or the like.

The pedal P at its lower or pivoted end portion is provided with an upstanding arm 1 having at its outer extremity a laterally disposed tongue or lug 2.

Operatively supported by the chassis C of a vehicle at the forward portion thereof is a shaft S carrying an upstanding rock arm 3 which is normally in engagement with the tongue or lug 2. One portion of the shaft S is provided with a crank 4 disposed upwardly and which underlies the seat structure A. This structure A includes a standard 5 which is slidably disposed through the floor F of the chassis and which has contact from above with the crank 4.

The shaft S is provided with a second crank 6 disposed in substantially the same direction as the crank 4 and operatively engaged, as at 7, with this crank 6 is an end portion of a lever 8. The lever 8 is supported, as at 9, intermediate its ends for swinging movement in a vertical direction and adjustably engaged with the end portion of the lever 8 remote from the crank 6 is a poise or weighted member 10.

In practice, the member 10 is adjusted on the lever 8 to counterbalance the weight of the seat structure A plus the weight of the person occupying such seat structure so that under normal conditions the brake mechanism M may be readily and conveniently operated in a conventional manner by the operator through the medium of the pedal P. However, should the occupant leave the structure A or rise therefrom, the poise or weighted member 10 will, through the medium of the lever 8, cause the shaft S to rotate in a direction whereby the rock arm 3 will press with sufficient force against the tongue or lug 2 to set the brake mechanism.

It is, therefore, to be readily understood that with the use of my improved brake controlled mechanism the driver or operator of the vehicle is compelled to occupy the seat structure during the time the vehicle is in travel and thus minimizing the liability of leaving the vehicle with the brake mechanism in release when the driver or operator running the vehicle is not on the seat structure.

Furthermore, with my improved mechanism, the driving of a vehicle by an unauthorized person is also prevented because should the seat be occupied by an individual of a weight different from that of the person for whom the poise or member 10 has been adjusted, the brake mechanism will be set either as a result of the poise or member 10 or the increased weight of the unauthorized person.

I also find it of advantage to interpose in the fuel line 11 a control valve 12 having a crank operating member 14 overlying the lever 8. When the outer end portion of the lever 8 is in its normal position, the resultant contact with the member 14 maintains the line open but when the brake mechanism M is set as a result of swinging of the lever 8, the valve 12 will be closed through the instrumentality of the spring 15 or the like.

I also find it of advantage to interpose in the ignition circuit 16 a normally closed circuit closer comprising the spaced contacts 17 and the movable contact 18. The movable contact 18 is carried by a rock lever 19. This lever as disclosed in Figure 4 is mounted intermediate its ends, as at 20, for swinging movement and the end portion remote from the contact 18 is held against the rock arm 3 by the spring 21. Under normal conditions, the rock arm maintains the contact 18 in requisite engagement with the contacts 17 but as the arm 3 moves forwardly to set the brake mechanism, the spring 21 will operate to move the contact 18 away from the contacts 17 and thus break the ignition circuit.

From the foregoing description it is thought to be obvious that a brake operating mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In combination with a vehicle having a brake mechanism including a brake operating lever, a crank shaft journaled upon the vehicle and having spaced crank arms, one of which is adapted to encounter the brake operating lever, a weighted lever pivoted upon the vehicle and having one end operatively engaging with another of the crank arms, and a seat post slidably mounted upon the vehicle and resting upon the third crank arm.

In testimony whereof I hereunto affix my signature.

HERBERT BRODIE.